US012742492B2

(12) United States Patent
Ludas et al.

(10) Patent No.: US 12,742,492 B2
(45) Date of Patent: Sep. 22, 2026

(54) HYDRODYNAMIC-MECHANICAL POWER TRANSMISSION DEVICE

(71) Applicant: Voith Patent GmbH, Heidenheim (DE)

(72) Inventors: Bernhard Ludas, Aalen (DE); Hartmut Graf, Urbach (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 19/056,128

(22) Filed: Feb. 18, 2025

(65) Prior Publication Data

US 2025/0189025 A1 Jun. 12, 2025

Related U.S. Application Data

(63) Continuation of application No. PCT/EP2023/071485, filed on Aug. 3, 2023.

(30) Foreign Application Priority Data

Aug. 18, 2022 (DE) ..................... 10 2022 120 840.0

(51) Int. Cl.
*F16H 47/08* (2006.01)

(52) U.S. Cl.
CPC .................................... *F16H 47/08* (2013.01)

(58) Field of Classification Search
CPC ............... F16H 47/08; F16H 2037/088; F16H 2057/0335; F16H 47/085
See application file for complete search history.

(56) References Cited

U.S. PATENT DOCUMENTS 3,500,704 A * 3/1970 Helmut ................. F16H 47/085 475/48
3,712,154 A 1/1973 Welch
(Continued)

FOREIGN PATENT DOCUMENTS

CN 111212988 A * 5/2020 ........ F16F 15/13484
DE 34 41 877 A1 5/1986
(Continued)

OTHER PUBLICATIONS

German Office Action dated Feb. 8, 2023 for German Patent Application No. 10 2022 120 840.0 (12 pages).
(Continued)

*Primary Examiner* — Justin Holmes
(74) *Attorney, Agent, or Firm* — TAYLOR & EDELSTEIN, PC

(57) ABSTRACT

A hydrodynamic-mechanical power transmission device includes: an input shaft; an output shaft; a basic transmission configuration including a hydrodynamic converter and a superimposition transmission, the hydrodynamic converter including a pump impeller and a turbine wheel, the superimposition transmission being formed as a planetary transmission including a ring gear, a first sun gear, and a planet carrier with a plurality of planetary gears, the input shaft being connected to the pump impeller and the ring gear, the turbine wheel being connected to the first sun gear, the output shaft being connected at least indirectly to the planet carrier; and an additional transmission stage, which is arranged in a direction of a power transmission between the superimposition transmission and the output shaft, the additional transmission stage including an input and an output, the input being connected to the planet carrier, the output being connected to or forming the output shaft.

15 Claims, 2 Drawing Sheets

(56) References Cited

U.S. PATENT DOCUMENTS

| | | | |
|---|---|---|---|
| 3,913,415 | A | 10/1975 | Herr |
| 4,014,223 | A | 3/1977 | Pierce, Jr. |
| 4,398,436 | A | 8/1983 | Fisher |
| 4,633,736 | A | 1/1987 | Sakakibara et al. |
| 11,111,993 | B1 | 9/2021 | Oledzki |
| 2004/0248693 | A1 | 12/2004 | Korner |

FOREIGN PATENT DOCUMENTS

| | | | | |
|---|---|---|---|---|
| DE | 10 2008 034 607 | A1 | 1/2010 | |
| DE | 102017101339 | A1 * | 7/2018 | ............. F16H 61/64 |
| EP | 0037059 | A2 * | 10/1981 | ........... F16H 47/085 |
| WO | 2012/143123 | A1 | 10/2012 | |
| WO | 2016/093200 | A1 | 6/2016 | |

OTHER PUBLICATIONS

Notification of the Transmission of the International Search Report and Written Opinion of the International Search Authority or Declaration dated Nov. 7, 2023 for International Application No. PCT/EP2023/071485 (13 pages).

"Planetary Gear Bearing Arrangements in Industrial Gearboxes", Schaeffler Technologies Gmbh & Co. KG, Germany, May 2014 (116 pages).

* cited by examiner

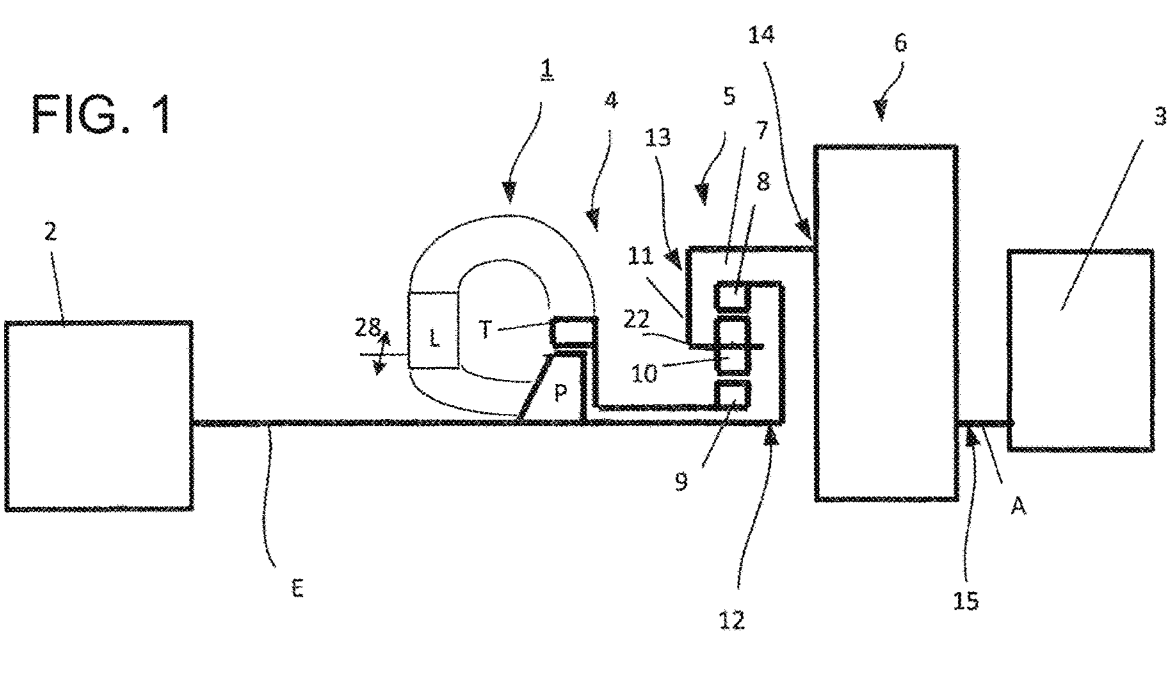
FIG. 1
1
2
3
4
5
6
7
8
9
10
11
12
13
14
15
22
28
L
T
P
E
A
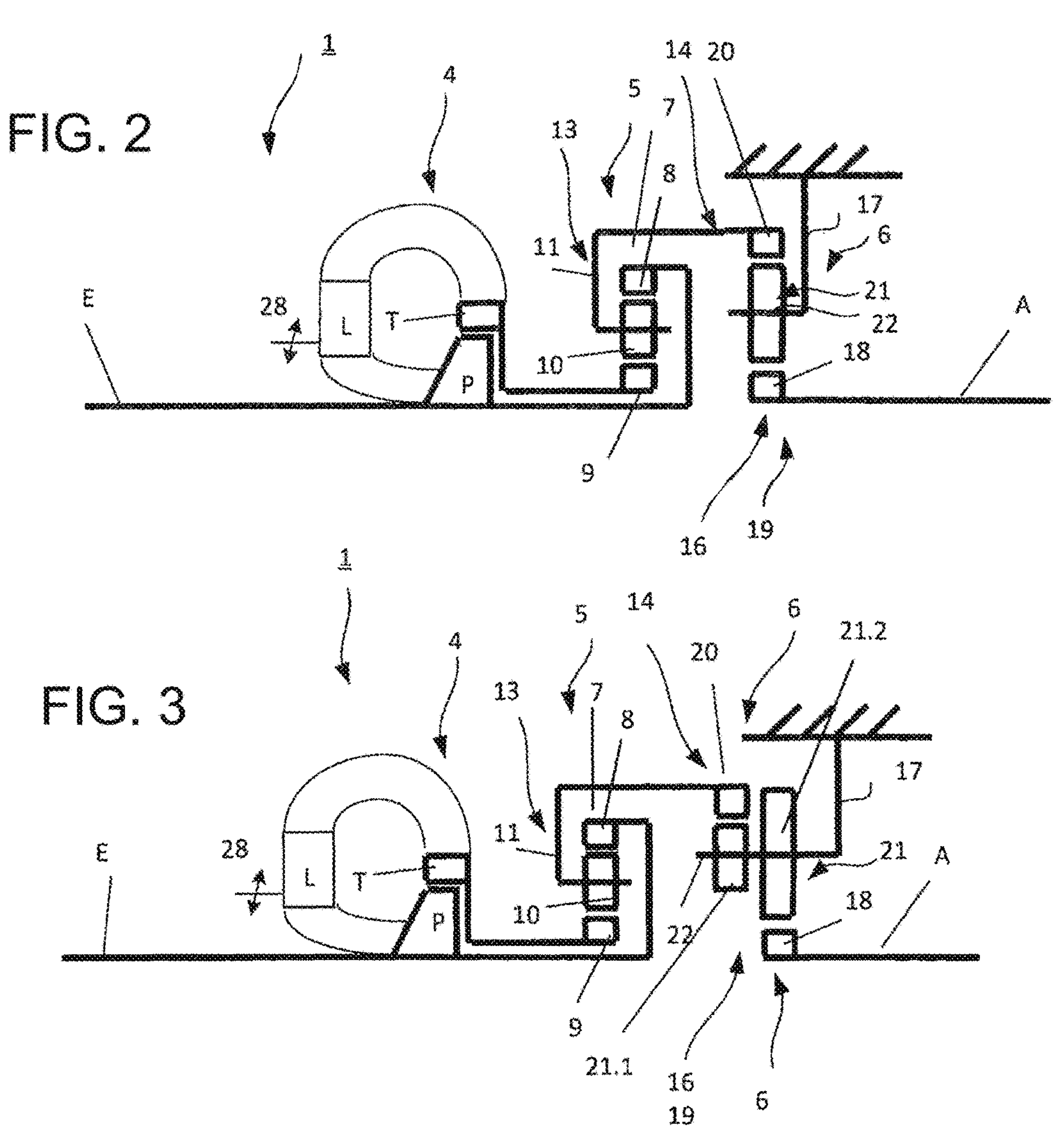
FIG. 2
1
4
5
6
7
8
9
10
11
13
14
16
17
18
19
20
21
22
28
L
T
P
E
A
FIG. 3
1
4
5
6
7
8
9
10
11
13
14
16
17
18
19
20
21
21.1
21.2
22
28
L
T
P
E
A 1
4
5
13
14
6
20
21.2
8
11
17
21.1
21
A
E
28
L
T
10
18
22
P
23
12
9
16
19
6
15

1
5
4
6
13
9
27
15
11
E
28
L
T
26
A
10
P
8
14
6
25

1
5
4
6
13
9
15
39
37
32
33
11
E
28
L
T
34
A
10
36
38
P
8
14
30
31

HYDRODYNAMIC-MECHANICAL POWER TRANSMISSION DEVICE

CROSS REFERENCE TO RELATED APPLICATIONS

This is a continuation of PCT application no. PCT/EP2023/071485, entitled "HYDRODYNAMIC-MECHANICAL POWER TRANSMISSION DEVICE", filed Aug. 3, 2023, which is incorporated herein by reference. PCT application no. PCT/EP2023/071485 claims priority to German patent application no. 10 2022 120 840.0, filed Aug. 18, 2022, which is incorporated herein by reference.

BACKGROUND OF THE INVENTION

1. Field of the Invention

The present invention relates to hydrodynamic-mechanical power transmission devices.

2. Description of the Related Art

Hydrodynamic-mechanical power transmission devices for driving a variable speed machine are known from the state of the art in various configurations.

A generic power transmission device includes an input for at least indirect connection to a constant speed drive unit and at least one output connection to a working machine with variable speed. Moreover, a hydrodynamic converter and at least one superimposition transmission designed as a planetary transmission, including a ring gear, a sun gear and a planet carrier with several planets as elements of the planetary transmission, are provided. The power is transmitted via a mechanical and a hydrodynamic power branch. The input is connected to a pump impeller of the hydrodynamic converter and a first element of the superimposition transmission. A turbine wheel of the hydrodynamic converter is connected to a second element of the superimposition transmission, and the output is connected at least indirectly to a third element of the superimposition transmission.

In a design described in DE 34 41 877 A1 the hydrodynamic power branch runs via a hydrodynamic converter in the embodiment of a synchronization converter and can be regulated in regard to speed by adjusting the blades of the converter guide wheel. This is again unified with the mechanically-transmitting power branch in the superimposition transmission, thus driving the working machine with the speed that is required for it, even though the drive unit which drives the power transmission at the input shaft runs at a constant speed. Based on this structure, DE 2008 034 607 describes a similar structure, wherein however the hollow shaft used therein is replaced by coupling shafts progressing parallel to the central axis of the power transmission unit.

In such power transmission devices between a drive machine and a machine that has to be driven, in particular a working machine, the hydrodynamic converter has to meet different requirements. Significant criteria are achievable efficiency, power consumption behavior and the change in torque and speed at the output, in other words, at the turbine wheel. In known power transmission devices, the operating status is influenced by adjusting the guide wheel and/or the degree of filling of the hydrodynamic converter with working medium.

There is prior knowledge of a power transmission device from publication WO201213123 A1, which has a hydrodynamic counter-rotation converter in place of a hydrodynamic synchronous converter. The counter-rotation converter is characterized by a lower efficiency than a synchronous converter but overall provides a very simple and compact design of the entire power transmission device. The first element of the planetary transmission of the superimposition transmission is provided by the planet carrier, while the second element is provided by the sun gear of the planetary transmission, and the third element is provided by the ring gear of the planetary transmission. This arrangement—wherein the ring gear is connected to the output shaft directly or via other gearing, optionally a spur gear, and wherein the hydrodynamic power branch is introduced via the sun gear—has the decisive advantage that the planetary transmission can be of very compact design due to the favorable speeds.

For the transmission of high power, the known designs are very large, or additional speed-/torque transmission devices are required.

The present invention provides a power transmission device that can be used to transmit very high power, while at the same time being of simple and compact construction. The overall system should moreover be designed so that a multitude of demands in regard to transmission ratio and arrangement of input and output relative to each other are to be achieved easily with it.

SUMMARY OF THE INVENTION

The invention relates to a hydrodynamic-mechanical power transmission device, in particular with the features of the generic term of claim 1. The invention relates in particular to a hydrodynamic-mechanical power transmission device for driving a variable speed working machine.

A hydrodynamic-mechanical power transmission device including an input shaft for at least indirect connection to a drive unit with constant speed and at least one output shaft for connection to a working machine with variable speed, a basic transmission configuration with a hydrodynamic converter and a superimposition transmission designed as a planetary transmission, including a ring gear, a sun gear, and a planet carrier with several planets as elements of the planetary transmission, wherein the input shaft is connected to a pump impeller of the hydrodynamic converter and a first element of the superimposition transmission, and wherein a turbine wheel of the hydrodynamic converter is connected to a second element of the superimposition transmission, and the output shaft is connected at least indirectly to a third element of the superimposition transmission, the hydrodynamic-mechanical power transmission device being characterized in that the first element of the superimposition transmission is represented by the ring gear, the second element of the superimposition transmission is represented by the sun gear, and the third element of the superimposition transmission is represented by the planet carrier, and that an additional transmission stage is arranged in the direction of power transmission between the superimposition transmission and output shaft, including an input and an output, wherein the input of the transmission stage is connected to the planet carrier of the superimposition transmission and the output of the transmission stage is connected to the output shaft of the power transmission device or represents the latter.

A hydrodynamic converter is understood to be a device for speed-/torque conversion. It includes at least three impellers which form a working chamber that can be filled with an operating medium, and which divert the flow of an operating medium.

The term "shaft" is to be understood functionally and includes any design of components that rotate around an axis of rotation and are suitable for transmitting torque.

Basic transmission configuration in the sense of the present invention means in particular a basic arrangement of converter and superimposition transmission in the embodiment of the planetary transmission. This may be provided as a prefabricated modular unit consisting of both components or can be assembled from individual converter and superimposition transmission modules in the form of a planetary transmission.

The solution according to the present invention offers the advantage of creating a basic transmission configuration consisting of hydrodynamic converter and planetary transmission which—with the previously described connectivity—permits power transmission in two power branches, which enables output via the carrier and which is designed for high power ranges, wherein adaptation to the specific application requirements with regard to the transmission ratio and orientation of the output is achieved by an additional subordinate transmission stage. The basic transmission configuration can be provided as a prefabricated modular unit, which can be completed in a simple manner for the purpose of adaptation to a wide variety of requirements by adding the additional transmission stage, which is optionally also designed as a modular unit. The combination of converter and superimposition transmission with the described connectivity can also dispense with an additional hydrodynamic coupling for starting, since the function of load-free starting can be achieved solely via the converter, depending on the filling state of the converter.

In an especially advantageous arrangement, the turbine wheel of the converter is connected to the sun wheel of the superimposition transmission on the side of the superimposition transmission facing the converter, wherein the maximum radial expansion of the components creating the connection between the turbine wheel and the sun wheel is smaller in the radial direction than the diameter of the superimposition transmission. In other words, the connection between the turbine wheel and the sun wheel is direct, in other words, without routing them around the superimposition transmission and thus along the shortest path in the axial direction between the input and the output of the power transmission device. Components rotating at high speeds are characterized by a significantly smaller diameter compared to the outer diameter of the superimposition transmission itself. This means that the basic transmission configuration consisting of converter and superimposition transmission can be built very compactly, and a complex housing of the epicyclic gearing can be dispensed with by routing the connecting shaft between the turbine wheel and the sun wheel. The connection between the turbine wheel and the sun gear, as a component rotating at high speed with a small diameter, is advantageous in terms of power density, and mounting of the individual shafts of the superimposition transmission becomes easier.

Regarding implementation of the connection between turbine wheel and sun gear there are a number of options. These include, in particular, rotationally symmetrical components, especially in the form of hollow shafts.

In one advantageous further development, the roller bearings normally used in planetary transmissions to support the planetary gears are replaced by sliding bearings in this design for low-wear operation.

According to a first design, the planet carrier of the superimposition transmission can be designed for this purpose with fixed planetary gear bolts, wherein the planetary gears are then mounted in a sliding manner on the planetary gear bolts. In a second alternative arrangement, the planetary gears are designed as a single component with the planetary gear bolts or are connected to them in a rotationally fixed manner, and the planetary gear bolts are mounted in a sliding manner in the planet carrier.

According to the requirements of a specific application and according to a first design, the input and output of the hydrodynamic-mechanical power transmission device can be arranged coaxially relative to one another, and according to a second design can be arranged eccentrically relative to one another.

Depending on the required transmission ratio, design of the additional transmission stage can be varied. However, a configuration is optionally selected which is compact, includes as few components as possible and is small in size.

According to a first advantageous embodiment with a coaxial arrangement of input and output, or drive and output power, the transmission stage is designed as a planetary gear arrangement, including at least one planet carrier that can be locked in place or is in a fixed housing, planetary gears and a gear which meshes with the planetary gears, which is coupled with the planet carrier of the superimposition transmission at least indirectly, optionally directly, and a sun gear which meshes with the planetary gears of the transmission stage and which is coupled with the output of the power transmission device or is designed integrally with it. This design is characterized by small installation space requirements in axial and radial direction.

In a first variation of said first embodiment the planetary gear arrangement of the transmission stage is designed as a simple planetary gear stage, wherein the gear which meshes with the planetary gears of the transmission stage is represented by a ring gear of the planetary gear stage. This facilitates sufficient ratios between superimposition transmissions and output into high speed and thus provision of low torques at the output while offering compact design in radial and axial direction. The use of simple planetary gear sets in the subordinate transmission stage moreover allows the use of standardized prefabricated planetary gear sets. In addition to space advantages, this solution also offers considerable cost advantages.

In a second variation, the hydro-mechanical power transmission device is characterized in that the planetary gear arrangement of the transmission stage is designed as a planetary gear set. The latter includes first and second planetary gears designed as stage planetary gears with different tooth diameters, wherein the gear of the planetary gear arrangement of the transmission stage connected with the output of the superimposition transmission is designed to mesh with the first stage planetary gears, and the sun gear of the planetary gear arrangement of the transmission stage is designed to mesh with the second stage planetary gears.

Depending on whether the design of the gear of the planetary gear arrangement that is connected to the output of the superimposition transmission is a ring gear or a sun gear, and whether the design of the gear connected to or forming the output is a sun gear, low speeds and high torques can be achieved by downgrading and introducing the torque into the transmission stage via the ring gear on the output side of the transmission stage while still maintaining a relatively compact structure. A first sub-design, in which the gear of the planetary gear arrangement of the transmission stage, which is connected to the output of the superimposition transmission and which meshes with the first planetary gears, is formed by a ring gear, allows greater ratios than a design according to a second sub-variation, in which the gear of the planetary gear arrangement of the transmission stage which is connected to the output of the superimposition transmission and which meshes with the first stage planetary gears is formed by a sun gear.

If the design of the transmission stage as a planetary gear arrangement allows very compact units in the radial and axial direction with the possibility of realizing large gear ratios, the additional transmission stage in a second variation includes at least one spur gear stage if an eccentric arrangement between the input and output of the power transmission device is desired. Very high transmission ratios can be achieved by designing the spur gear stage as a single-stage spur gear stage whose input is connected to the superimposed transmission and whose output is coupled to or forms the output of the power transmission device. With limited available installation space these can be increased even further in radial direction by a design as a multi-stage spur gear stage, whose input is connected to the superimposition transmission and whose output is coupled to or forms the output of the power transmission device.

As aforementioned, the individual components can be available as modules and can be assembled in modular fashion. This applies in particular to the converter and the superimposition transmission of the basic transmission configuration and to the additional transmission stage. The basic transmission configuration can thereby be assembled from the modular units of converter and imposition transmission, or the entire basic configuration can be offered as a preassembled unit. The design and assembly of prefabricated and—if possible—standardized modular units offer the advantage of reducing the number of components, while at the same time offering a wide variety of the power transmission device.

The hydrodynamic converter can be designed in various ways but is optionally designed as a control converter including at least one pump impeller, one turbine wheel and at least one guide wheel, whereby optionally at least one of the wheels has adjustable blades or blade segments. According to an especially advantageous design, adjustment blades are provided on the guide wheel, thus being able to achieve improved efficiency and a spread of the characteristic map. The inventive solution of adjustment of at least individual adjusting blades and/or adjustable blade segments offers the advantage of adjustability of the input power and an expansion of the operating range of the converter within the power transmission device.

The converter of the inventive power transmission device is designed as a synchronous converter. In this case, the pump impeller and the turbine wheel rotate in the same direction and facilitate simple connectivity of the superimposition transmission in the manner described.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 shows a schematic simplified representation of the basic structure of power transmission device;

FIG. 2 shows an embodiment of the power transmission device according to FIG. 1 with a subordinate transmission stage in the form of a simple planetary gear set;

FIG. 3 shows an embodiment of the power transmission device according to FIG. 1 with a downstream transmission stage with a single-stage planetary gear;

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figures 4, 5, 6:
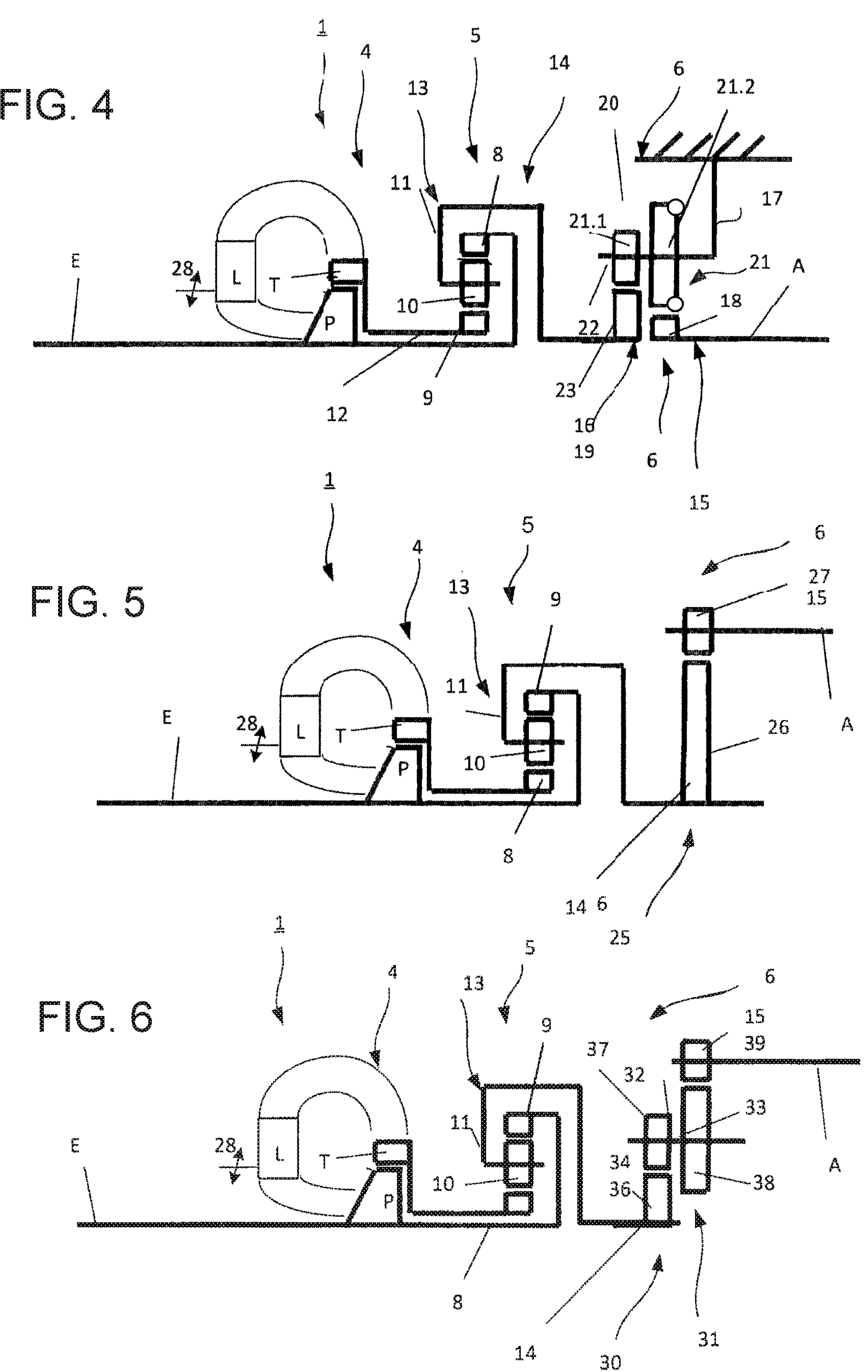
FIG. 4 shows an embodiment of the power transmission device according to FIG. 3 with a subordinate transmission stage with an alternative embodiment of a single-stage planetary gear.
FIG. 5 shows an embodiment of the power transmission device according to FIG. 1 with a subordinate transmission stage with a simple spur gear stage.
FIG. 6 shows an embodiment of the power transmission device according to FIG. 1 with a subordinate transmission stage with a multi-stage spur gear stage.

FIG. 1 clarifies in a simplified schematic representation the basic structure of a hydrodynamic-mechanical power transmission device 1 designed according to the present invention, hereinafter referred to briefly as a power transmission device for transmitting power from a drive machine 2 to a machine that is to be driven, in particular a working machine 3. Power transmission device 1 includes at least one input to introduce torque and at least one output. Power transmission device 1 is designed in particular to be suitable for transmitting power from a drive machine 2 with constant speed to a working machine 3 that can be operated at variable speed. The input is designed as an input shaft E for at least indirect connection with drive machine 2. The output is formed by an output shaft A for at least indirect connection to working machine 3. An at least indirect connection is understood to mean a direct connection and also a connection via additional intermediate components which can also include devices for speed-to-torque conversion.

Power transmission device 1 includes a hydrodynamic speed-/torque converter, hereinafter referred to as hydrodynamic converter 4, and a superimposition transmission 5 as well as a transmission stage 6, arranged between superimposition transmission 5 and output A for adaptation to different required transmission ratios and/or installation situations. Hydrodynamic converter 4, superimposition transmission 5 and transmission stage 6 are arranged downstream of one another in axial direction between input shaft E and output shaft A.

Superimposition transmission 5 has an input 12 and an output 13. Input 12 of superimposition transmission 5 is coupled with converter 4 and input E of power transmission device 1. Output 13 of superimposition transmission 5 is connected with input 14 of transmission stage 6. Output 15 of transmission stage 6 is coupled with or forms output or output shaft A of the power transmission device.

According to a first embodiment illustrated in FIG. 1, input shaft E and output shaft A of power transmission device 1 can be arranged coaxially relative to one another, or also eccentrically.

Superimposition transmission 5 is designed as a planetary transmission 7, including at least one ring gear 8, one sun gear 9 and one planetary carrier or bar 11 supporting planetary gears 10. Planetary gears 10 are mounted rotatably on bar 11. The mounting can be implemented in such a way that the bar has 12 fixed planetary gear bolts and that planetary gears 10 are rotatably mounted on them. An alternative design consists of a rotatable mounting of planetary bolts 22 that support planetary gears 10 in a torsionally fixed manner.

Hydrodynamic converter 4 includes at least one pump impeller P, one turbine wheel T and one guide wheel L.

Converter 4 is designed as a single-phase hydrodynamic converter or synchronization converter, in other words, pump impeller P and turbine wheel T rotate in the same direction. Other designs are also conceivable, for example multi-stage converters.

For additional modification of the circulation flow and the characteristic curve, converter 4 is designed as a control converter. For this purpose, the blading of at least one of the elements pump impeller P, turbine wheel T or guide wheel L includes one or a plurality of adjustable blades or adjustable blade segments. In the illustrated case, adjustment device 28 for blade adjustment is assigned to guide wheel L in an especially advantageous manner.

Viewed in axial direction, converter 4 and superimposition transmission 5 are arranged one after the other between input E and output A. Additional transmission stage 6 is functionally subordinate to superimposition transmission 5, viewed in axial direction. Converter 4, superimposition transmission 5 and transmission stage 6 can be stored as prefabricated and preassembled modules and combined with each other according to specific application requirements. The modular structure offers the advantage of being able to meet different operating conditions quickly and with little effort with as few basic components or assemblies as possible.

According to the present invention, pump impeller P of converter 4 is coupled to input E and at least indirectly to ring gear 8 of the planetary transmission in a rotationally fixed manner, while turbine T wheel is connected to sun gear 9. Planetary carrier or bar 11 forms output 13 of superimposition transmission 5. Hydrodynamic converter 4 and planetary transmission 7 are arranged coaxially relative to one another. The coupling structure thus designed and connected to the converter 4 allows the transmission of substantial power at the output of the superimposition transmission. To adjust the speed when coupling power transmission device 1 with working machine 3, or to achieve the required transmission ratio, a transmission stage 6 is subordinate to superimposition transmission 5. Transmission stage 6 includes an input 14 which is connected with output 13 of superimposition transmission 5, and an output 15 which forms or is connected with output A of power transmission device 1.

As shown in FIG. 1, input E and output A of power transmission device 1 are arranged either coaxially to one another, or eccentrically. The specific arrangement depends on the specific application.

There are a number of possibilities regarding the design of power transmission device 1. If coaxial arrangements of input E and output A are required, transmission stages 6 in the embodiment of planetary gear arrangements are optional. These can be designed as a simple planetary gear set or as planetary gear stage arrangements. Possible arrangements are shown in FIGS. 2 to 4 which represent designs of power transmission device 1. Transmission stages 6 illustrated therein have in common that they include a planetary gear arrangement 16 with at least one stationary, in particular fixed, bar or planetary carrier 17 and one sun gear 18 which forms output 15 of transmission stage 6 or is connected with it. For this purpose, planetary carrier 17 is either stationary or fixed or alternatively is actively held by a brake device which is not shown. Input 14 of transmission stage 6 is formed by another element of planetary gear arrangement 16.

FIG. 2 shows one design of a subordinate transmission stage 6 as a simple planetary gear set 19, whose input 14 is provided by ring gear 20. The connection between ring gear 20 and transmission stage 6 and planetary carrier 11 of superimposition transmission 5 is routed outside of the outside diameter of superimposition transmission 5. Sun gear 18 is arranged coaxially relative to input E of power transmission device 1 and forms output A of power transmission device 1 or is connected to it in a rotationally fixed manner. Planetary gears 21 of planetary gear set 19 of planetary gear arrangement 16 mesh with ring gear 20 and sun gear 18. Sun gear 18 and ring gear 20 are arranged in an axial plane.

FIGS. 3 and 4 illustrate designs of planetary gear arrangements 16 with stage planets, in particular a stage planet with a stage for using so-called stage planetary gears 21.1 and 21.2. The stage planetary gears are optionally mounted coaxially relative to one another on planetary carrier 17 and can be present on an integrally designed component with different tooth diameters or as individual separate stage planetary gears 21.1 and 21.2 which are connected with each other. In this case, these are optionally rotatably mounted on a planetary gear bolt 22 that is firmly connected to planet carrier 17 or integrally formed on planet carrier 17. It is also conceivable to design staged planetary gears 21.1, 21.2 as separate or interconnected gears which are mounted on a rotatable planetary gear bolt 22.

Hydrodynamic converter 4 and superimposition transmission 5 correspond to the design shown in FIG. 2.

Planetary gear device 16 of transmission stage 6 shown in FIG. 3 is designed with a single-stage planet. Input 14 of transmission stage 6 is formed by a ring gear 20 which meshes with first stage planetary gears 21.1. First stage planetary gears 21.1 are coupled with second stage planetary gears 21.2, in particular via the common and fixed planet carrier 17. Output 15 is formed by a sun gear 18 which meshes with second stage planetary gears 21.2. First stage planetary gears 21.1 have a smaller tooth diameter than second stage planetary gears 21.2. Thus, a ratio into lower speed is achieved. The desired gear ratio can be adjusted by selecting the gear diameters of stage planetary gears 21.1, 21.2.

Compared to the arrangements shown in FIGS. 2 and 3, FIG. 4 shows an alternative arrangement of a gear stage 6. Planetary gear arrangement 16 also includes here a stage planet with first and second stage planetary gears 21.1, 21.2 with a common bearing axis. In contrast to the design in FIG. 3, input 14 of gear stage 16 is formed by a sun gear 23 and the output is formed by a sun gear 18 which meshes with second stage planetary gears 21.2.

In contrast, FIGS. 5 and 6 show arrangements of power transmission device 1 with transmission stages 6 in the form of spur gear stages, wherein these are used predominantly for applications with required offset between input E and output A.

FIG. 5 shows a simple spur gear stage 25 which includes an even number, in particular two, spur gears 26 and 27 which mesh with each other. Spur gear 26 forms input 14 of transmission stage 6 or is connected with it, and spur gear 27 forms output 15 of transmission stage 6 or is connected with it. This type of transmission stage 6 offers very compact construction in axial direction. However, to achieve a large transmission ratio with this design, spur gear 26 must be designed accordingly with a large diameter.

In order to keep the installation space as compact as possible in the radial direction, a design of gear stage 6 as a spur gear 29 with two spur gear stages 30 and 31 connected in series is proposed according to FIG. 6, whereby output 32 of first spur gear stage 30 is connected to input 33 of second spur gear stage 31 and these are arranged coaxially to one another. First spur gear stage 30 includes a first spur gear 36 which forms input 34 of the first spur gear stage and thus also input 14 of transmission stage 6. It meshes with spur gear 37 which forms output 32 of first spur gear stage 30. Output 37 is coupled with input 33 of second spur gear stage 31. This is formed by a first spur gear 38. Both spur gears 37 and 38 are mounted on a common shaft. Output 15 of transmission stage 6 is formed by gear 39 of second spur gear stage 31 and is mounted on output shaft A.

With regard to adjustment devices 28 that are to be designed for the blading of converter 4 according to FIGS. 1 to 6, there is a wide range of possibilities. These can be designed in a wide variety of ways and differ with regard to the implementation of a number of sub-functions, which include the type of generation of the adjusting force, the direction of introduction of the adjusting force, the type of adjustment of the individual adjusting blade and/or of the adjustable blade segment and the type of blade control. With regard to the type of control, a distinction can be made between centralized control, that is, adjustment of all adjusting blades and/or adjustable blade segments, or individual or group adjustment of the adjusting blades and/or adjustable blade segments. The specific selection is made according to the requirements of the application.

COMPONENT IDENTIFICATION LISTING

1 power transmission device
2 drive machine
3 working machine
4 converter
5 superimposition transmission
6 transmission stage
7 planetary transmission
8 ring gear
9 sun gear
10 planetary gears
11 bar, planetary carrier
12 input-superimposition transmission
13 output-superimposition transmission
14 input-transmission stage
15 output-transmission stage
16 planetary gear arrangement
17 planetary carrier, bar
18 sun gear
19 planetary gear set
20 ring gear
21 planetary gears
21.1,21.2 stage/step planetary gear
22 planetary gear bolt
23 sun gear
25 spur gear stage
26 first spur gear
27 second spur gear
28 adjustment device
29 spur gear transmission
30 spur gear stage
31 spur gear stage
32 output-first spur gear stage
33 input-second spur gear stage
34 input-first spur gear stage
35 output-second spur gear stage
36 first spur gear
37 second spur gear
38 first spur gear
39 second spur gear
E input; input shaft of power transmission device
A output, output shaft of power transmission device
P pump impeller
T turbine wheel
L guide wheel While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydrodynamic-mechanical power transmission device, comprising:

an input shaft configured for at least indirectly connecting to a drive unit;

at least one output shaft configured for connecting to a working machine with a variable speed;

a basic transmission configuration including a hydrodynamic converter and a superimposition transmission, the hydrodynamic converter including a pump impeller and a turbine wheel, the superimposition transmission being formed as a planetary transmission including a ring gear, a first sun gear, and a planet carrier with a plurality of planetary gears, the input shaft being connected to the pump impeller and the ring gear, the turbine wheel being connected to the first sun gear, the at least one output shaft being connected at least indirectly to the planet carrier; and an additional transmission stage, which is arranged in a direction of a power transmission between the superimposition transmission and the at least one output shaft, the additional transmission stage including an input and an output, the input of the additional transmission stage being connected to the planet carrier of the superimposition transmission, the output of the additional transmission stage being connected to or forming the at least one output shaft, wherein the superimposition transmission includes a side, wherein the turbine wheel is connected to the first sun gear of the superimposition transmission on the side of the superimposition transmission facing the hydrodynamic converter, wherein the hydrodynamic-mechanical power transmission device includes a connection between the turbine wheel and the first sun gear, the connection including a plurality of components, wherein a maximum radial expansion of the plurality of components is smaller in a radial direction than a diameter of the superimposition transmission.

2. The hydrodynamic-mechanical power transmission device according to claim 1, wherein:

(a) the planet carrier includes a plurality of planetary gear bolts which are fixed, wherein the plurality of planetary gears are mounted in a sliding manner on the plurality of planetary gear bolts; or (b) the plurality of planetary gears are formed as a single component with the plurality of planetary gear bolts or are connected with the plurality of planetary gear bolts in a rotationally fixed manner, the plurality of planetary gear bolts being mounted in a sliding manner in the planet carrier.

3. The hydrodynamic-mechanical power transmission device according to claim 1, wherein the input shaft and the at least one output shaft are arranged coaxially relative to one another.

4. The hydrodynamic-mechanical power transmission device according to claim 1, wherein the input shaft and the at least one output shaft are arranged eccentrically relative to one another.

5. The hydrodynamic-mechanical power transmission device according to claim 1, wherein (a) the additional transmission stage and one of (b) the basic transmission configuration and (c) (i) the hydrodynamic converter and (ii) the superimposition transmission are formed as modular units.

6. The hydrodynamic-mechanical power transmission device according to claim 1, wherein the hydrodynamic converter is formed as a synchronization converter.

7. The hydrodynamic-mechanical power transmission device according to claim 1, wherein the hydrodynamic converter is formed as a control converter, which includes the pump impeller, the turbine wheel, and at least one guide wheel.

8. The hydrodynamic-mechanical power transmission device according to claim 7, wherein the at least one guide wheel has at least one adjustable blade or at least one adjustable blade segment.

9. The hydrodynamic-mechanical power transmission device according to claim 1, wherein the drive unit is a drive machine with a constant speed.

10. A hydrodynamic-mechanical power transmission device, comprising:

an input shaft configured for at least indirectly connecting to a drive unit;

at least one output shaft configured for connecting to a working machine with a variable speed;

a basic transmission configuration including a hydrodynamic converter and a superimposition transmission, the hydrodynamic converter including a pump impeller and a turbine wheel, the superimposition transmission being formed as a planetary transmission including a ring gear, a first sun gear, and a planet carrier with a plurality of planetary gears, the input shaft being connected to the pump impeller and the ring gear, the turbine wheel being connected to the first sun gear, the at least one output shaft being connected at least indirectly to the planet carrier; and an additional transmission stage, which is arranged in a direction of a power transmission between the superimposition transmission and the at least one output shaft, the additional transmission stage including an input and an output, the input of the additional transmission stage being connected to the planet carrier of the superimposition transmission, the output of the additional transmission stage being connected to or forming the at least one output shaft, wherein the plurality of planetary gears is a first plurality of planetary gears, wherein the superimposition transmission includes an output, wherein the additional transmission stage is formed as a planetary gear arrangement, which includes at least one planet carrier that is configured for being locked in place or for being in a fixed housing, a second plurality of planetary gears, a gear which meshes with the second plurality of planetary gears and which is coupled with the output of the superimposition transmission, and a second sun gear which meshes with the second plurality of planetary gears of the additional transmission stage and which is coupled with the output shaft or is formed integrally with the output shaft.

11. The hydrodynamic-mechanical power transmission device according to claim 10, wherein the gear which meshes with the second plurality of planetary gears and which is coupled with the output of the superimposition transmission is coupled with the at least one planet carrier of the superimposition transmission indirectly or directly.

12. The hydrodynamic-mechanical power transmission device according to claim 10, wherein the planetary gear arrangement is formed as a planetary gear stage, wherein the gear which meshes with the second plurality of planetary gears of the additional transmission stage is formed by a ring gear of the planetary gear stage.

13. The hydrodynamic-mechanical power transmission device according to claim 10, wherein the planetary gear arrangement is formed as a stage gear set, which includes the second plurality of planetary gears which include a first stage of planetary gears and a second stage of planetary gears with different tooth diameters relative to one another, wherein the gear of the planetary gear arrangement which is connected with the output of the superimposition transmission meshes with the first stage of planetary gears, and the second sun gear of the planetary gear arrangement meshes with the second stage of planetary gears.

14. The hydrodynamic-mechanical power transmission device according to claim 13, wherein the gear of the planetary gear arrangement which is connected with the output of the superimposition transmission and which meshes with the first stage of planetary gears is formed as a ring gear.

15. The hydrodynamic-mechanical power transmission device according to claim 13, wherein the gear of the planetary gear arrangement which is connected with the output of the superimposition transmission and which meshes with the first stage of planetary gears is formed as a third sun gear.

* * * * *